United States Patent [19]
Tourret

[11] 3,771,873
[45] Nov. 13, 1973

[54] OPTICAL DISTANCE AND THICKNESS CONVERTER

[75] Inventor: Jean Tourret, Montrouge, France

[73] Assignee: Compagnie des Compteurs, Paris, France

[22] Filed: Nov. 4, 1971

[21] Appl. No.: 195,770

[30] Foreign Application Priority Data
Jan. 15, 1971 France .............................. 7101304

[52] U.S. Cl. ...................... 356/4, 356/1, 356/156, 356/161, 250/219 TH, 250/227
[51] Int. Cl. ...................... G01c 3/08, G01b 11/00
[58] Field of Search .................. 356/4, 1, 161, 156; 250/227, 219 TH; 350/96 B

[56] References Cited
UNITED STATES PATENTS
3,327,584  6/1967  Kissinger.............................. 356/4

Primary Examiner—Benjamin A. Borchelt
Assistant Examiner—S. C. Buczinski
Attorney—William R. Sherman et al.

[57] ABSTRACT

In accordance with an illustrative embodiment of the invention, an apparatus is provided which comprises a fiber optic bundle for transmitting light to an emitting end thereof to illuminate a front and rear surfaces of a transparent body opposite this emitting end. At least two fiber optic receiver bundles each having at least one receiving end for picking up light reflected by a respective one of said surfaces are provided for transmitting a luminous flux to produce a respective signal linearly related to the relative distance between the respective surface and the emitting end. The difference of the signals gives an indication of the spacing between the two surfaces, i. e., the thickness of the body. A third fiber optic bundle is provided to obtain a third signal related to the distance of the rear surface according to a desired relationship. The third signal is used to provide a compensated indication of the thickness.

12 Claims, 17 Drawing Figures

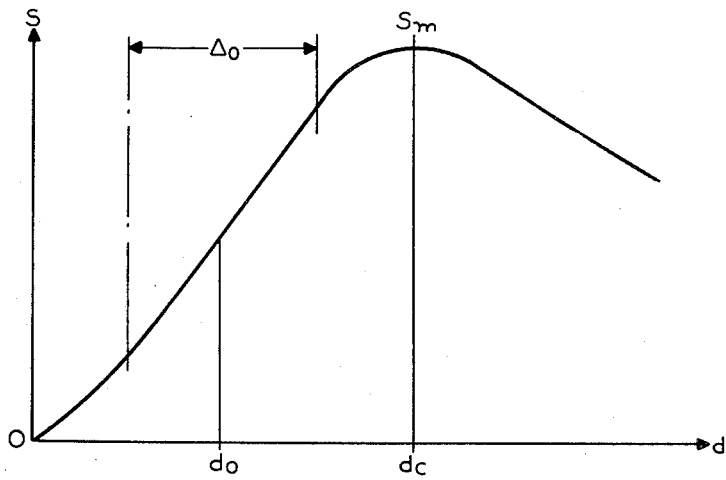
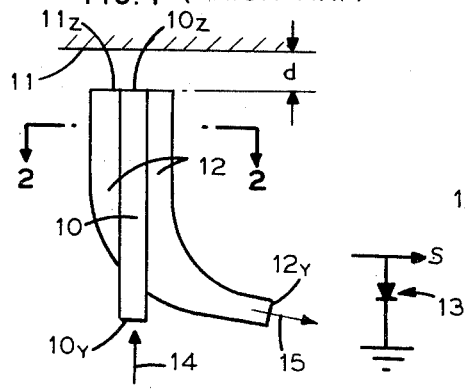
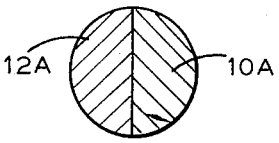
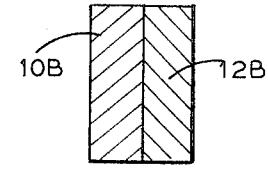
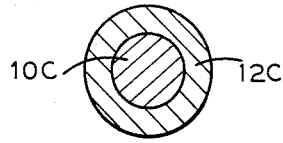
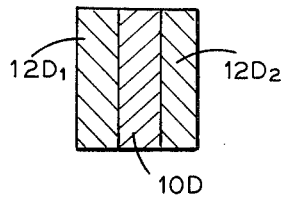
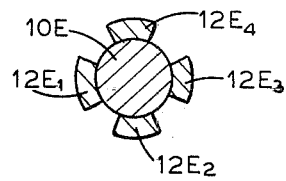

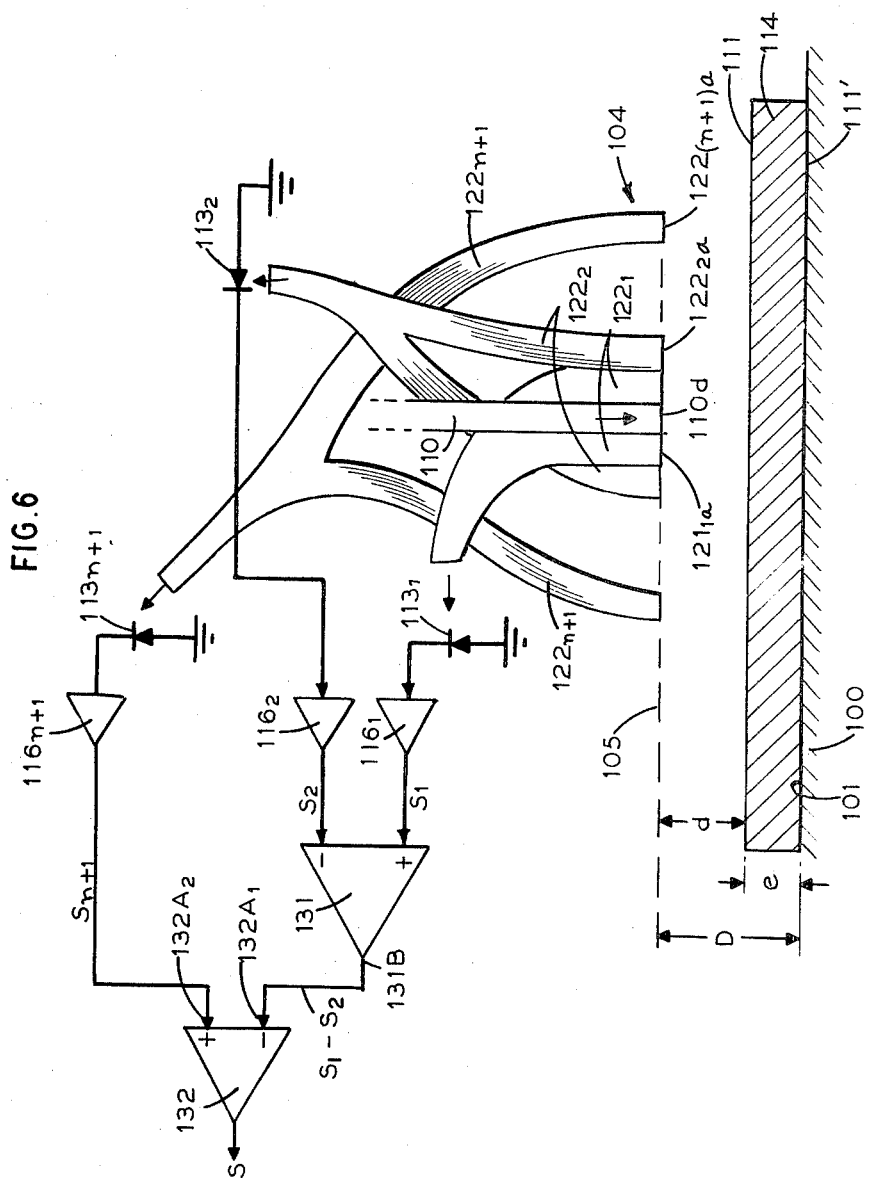

OPTICAL DISTANCE AND THICKNESS CONVERTER

The present invention relates to distance converting techniques and more particularly to an apparatus for obtaining signals representative of the relative distances with respect to a reference face of two spaced apart faces with a view to obtain indications of the distance therebetween.

It is therefore an object of the invention to provide an optical distance converting apparatus for obtaining indications of the distance separating two spaced apart surfaces which are particularly suitable for measuring the thickness of a transparent body.

In accordance with the invention an apparatus is provided which comprises optical guide means for transmitting light to an emitting end thereof to illuminate two light reflecting surfaces opposite this emitting end and spaced apart by a distance to be measured, such as the front and rear surfaces of a transparent body which are spaced apart by a distance representing the thickness thereof. At least two optical guide receiver means having each at least one receiving end for picking up light from a respective one of said surfaces are provided for transmitting a luminous flux to produce a respective signal related to the relative distance between the respective Surface and the emitting end. Signal combining means are responsive to the respective signals to obtain an indication of distance between the two surfaces. A third optical guide receiver means is provided to obtain a third signal related to the distance of at least one of said surfaces according to a desired relationship. The signal combining means are also responsive to the third signal to provide a compensated indication of the distance between the two surfaces.

The background of the invention and the principles on which it is based as well as other objects and aspects will be best understood by referring to the following description given in reference to the accompanying drawings in which:

FIG. 1 schematically shows a prior art optical distance converter;

FIG. 1A is a diagram of a characteristic response curve for the prior art device of FIG. 1;

FIGS. 2A to 2E show examples of possible cross-sections for these prior art converters;

FIG. 6 shows a thickness converter according to the invention; and

Figure 3:
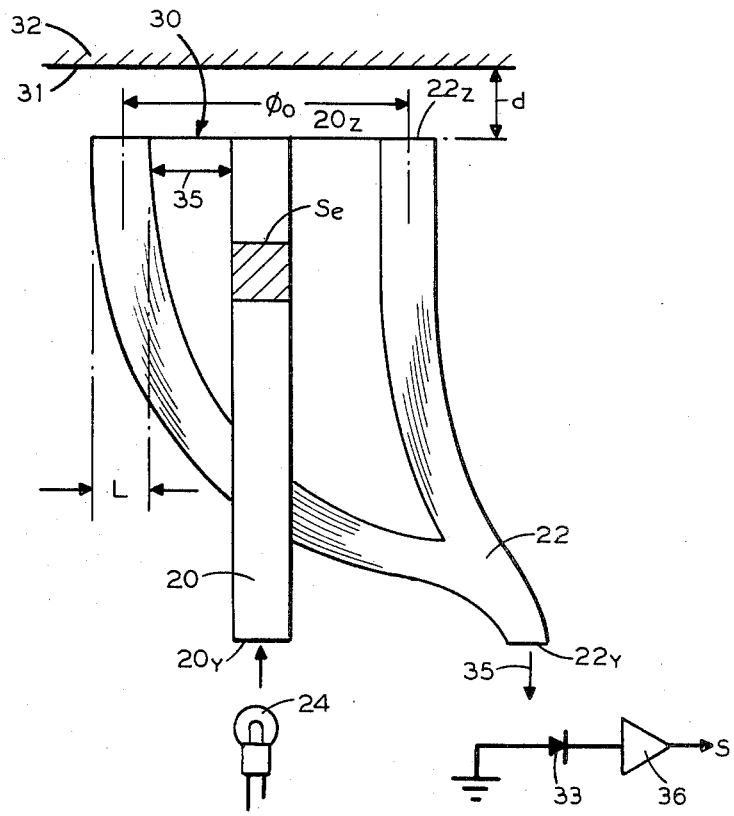
FIG. 3 shows a converter embodying principles on which the invention is based.

A simple conventional converter is first described with reference to FIGS. 1, 1A and 2A to 2E. The converter of FIG. 1 has a bundle 10 of optical fibers oriented perpendicular to a surface 11 under test. Light from a light source figured by an arrow 14 is admitted at its remote end $10y$ and emitted through its end $10z$ toward the surface 11 spaced by a distance $d$ from this emitting end. The surface 11 has at least some light reflecting power and it is desired to detect the relative displacements of this surface by sensing the variations of its distance to the emitting end $10y$. The first bundle 10 or transmitting bundle is associated with a second bundle 12 or receiver bundle which directs a flux of light reflected by the surface 11 towards a photoelectric detector 13, for example a phototransistor, a photo diode or a photo resistor, when this surface 11 is illuminated by the transmitting bundle 10. The detector 13 furnishes an electric signal S providing for the measurement of the variations in the distance $d$ between the converter and the test surface 11.

The receiver bundle 10 of optical fibers has a light receiving end $12z$ juxtaposed to the emitting end $10A$, which faces the surface 11 to pick up the light reflected thereby. The light flux transmitted by the bundle 12 emerges from a light output $12y$ as indicated by arrow 15 toward the detector 13. This receiving end may be comprised of several elementary ends of corresponding elementary bundles merging into a complex receiver bundle 12 for transmitting the reflected light flux to a common output $12y$.

FIGS. 2A to 2E diagramatically show cross-sections of the bundles 10 and 12 of a converter as shown in FIG. 1 along lines such as II—II in the vicinity of the emitting and receiving ends of these bundles. In FIGS. 2A and 2B respectively semicircular and rectangular transmitter and receiver bundles $10A$, $10B$ and $12A$, $12B$ are juxtaposed along a junction plane, whereas a tubular receiving bundle $12C$ surrounds a cylindrical transmitting bundle $10C$ in FIG. 2C. In FIG. 2D, a transmitting bundle $10D$ is sandwiched between two elementary receiver bundles $12_{D1}$ and $12_{D2}$ whereas in FIG. 2E four elementary receiver bundles $12_{E1}$ to $12_{E4}$ are distributed around the cylindrical transmitting bundle $10E$.

The diagram of FIG. 1A shows the characteristic response curve $S(d)$ of the converter of FIG. 1. This curve comprises a linear zone in a distance range $\Delta o$, centered about a mid-range distance value $d_o$, in which the converter is used. The geometry of the bundles of fibers, some examples of which have been discussed with reference to FIGS. 2A to 2E, and their dimensions determine this characteristic, in particular the extent of the zone $\Delta o$, the maximum amplitude $Sm$ and the value $d_c$ of the corresponding distance. Under these conditions, the mean frontal distance of a converter, i.e., the value of the mid-range distance $d_o$ referred sometimes later to as its "frontal" for short, its sensitivity (slope of the linear zone), its measurement range $\Delta o$, and consequently its accuracy are not independent parameters. Moreover, it can be seen that the origin of the characteristic curve is situated at a distance $d=o$ wherefrom the signal S increases practically as soon as the distance $d$ starts increasing.

FIG. 3 shows a converter having a sensing head 30 opposite a surface 31 of a sample 32 whose distance $d$ relative to the sensing head 30 is to be converted into a representative signal.

The converter of FIG. 3 has a transmitting bundle with respective admitting and emitting ends $20y$ and $20z$, the admitting end being adjacent to a light source 24 and the emitting end 20z being flush in the sensing head 30 facing the surface 31. The converter also includes a receiver bundle 22 having an output end 22y adjacent to a photodiode 33 for converting light fluxes transmitting as shown by arrow 35 at this output end 22y into related electrical signals S. The receiver bundle at the receiving end 22z is also comprised in the sensing head 30 in substantially coplanar relationship with the emitting end 20z, the surface 31 being placed parallel to the sensing head 30.

The cross-sectional shape of the terminal portion of this receiver bundle 22 is annular substantially as shown for the bundle 12C of FIG. 2C. Also, as in FIG. 2C, the transmitting bundle 20 is cylindrical. However, in this instance, the terminal portion of the receiver bundle 22 and its ring shaped receiving end 22z surround the terminal portion of bundle 20 and its respective circular emitting end 20z at a discrete spacing therefrom. In other words the receiving end 22z is not juxtaposed to the emitting end 20z and is actually transversely separated therefrom in the sensing head 30 by a discrete amount. This amount is defined here by the diamension of a gap separating opposite lateral boundaries of the terminal portions of the receiving and emitting bundles. In the converter of FIG. 3, this gap in the sensing head 30 is not made of any optically active medium such as any other light transmitting emitting or receiving end.

The particular shapes of the non-juxtaposed receiving and admitting ends could be different such as depicted in FIGS. 2A to 2E for example. Also the ring-shaped receiving end of the presently described embodiment could be made of a circular series of elementary receiving ends equally spaced from said emitting end 20z, these elementary ends forming the terminal portions of respective elementary bundles which merge into a complex bundle 22.

Figure 3A:
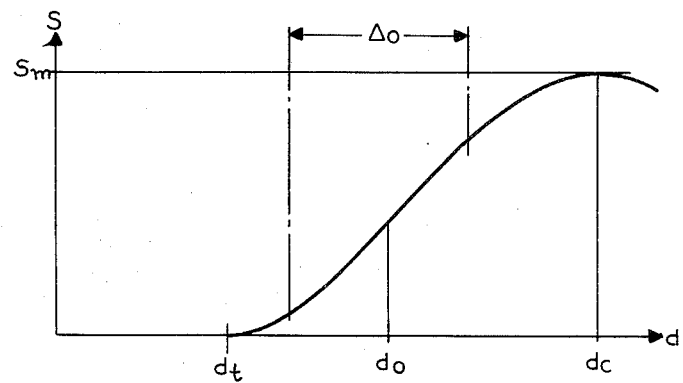
FIG. 3A shows the characteristic response curve of the converter of FIG. 3.

Referring again to FIG. 3, the mean diameter $\phi_o$ of the annular receiving ring 22z which characterizes the spacing between the emitting and receiving ends determines the frontal distance $d_o$ of the converter. The width L of the receiving ring determines the extent $\Delta_o$ of the distance range of linear operation (FIG. 3A). The maximum value $Sm$ of the signal S when $d = d_c$ is a function of the luminous flux transmitted, hence of the tranverse cross-section $S_e$ of the transmitting bundle 20, and of the ratio of the transverse cross-section of the receiving bundle 22 to the total cross-section of the converter.

FIG. 3A shows that in this case the "origin" of the characteristic curve, or distance $d_t$ where a signal noticeable for practical purposes can be detected may be quite different from zero.

It can then be understood that by adjusting the three parameters $\phi_o$, L and $Se$ defined above, it is possible to obtain a series of converters having an adjustable frontal distance $d_o$, all with the same measurement range $\Delta_o$, and the same sensitivity (which is a function of $\Delta o$ and $Sm$). For this purpose, the knowledge of $\Delta o$ permits L to be obtained. The choice of the value $d_o$ determines the diameter $\phi_o$ to use. In order to compensate for the loss of sensitivity with respect to the converter shown in FIG. 1 in which $d_o \sim (\Delta o/2)$, loss which occurs when the receiving end is transversely spaced apart from the emitting end, the cross-section $Se$ is increased for compensation. As an alternative the value of the sensitivity can also be adjusted by acting on the gain of a preamplifier 36 connected at the output of the photoelectric detector 33.

More than one receiver bundle can be used with the same transmitting bundle. In particular, two receiver bundles 22 having receiving ends may be arranged to provide signals varying linearly about predetermined spaced apart distance, which may be the average respective distances of two different spaced apart surfaces both opposite to the sensing head such as the front and rear faces of a transparent body for example. These receiver bundles may then have their respective output ends associated with two respective detectors.

Figure 4:
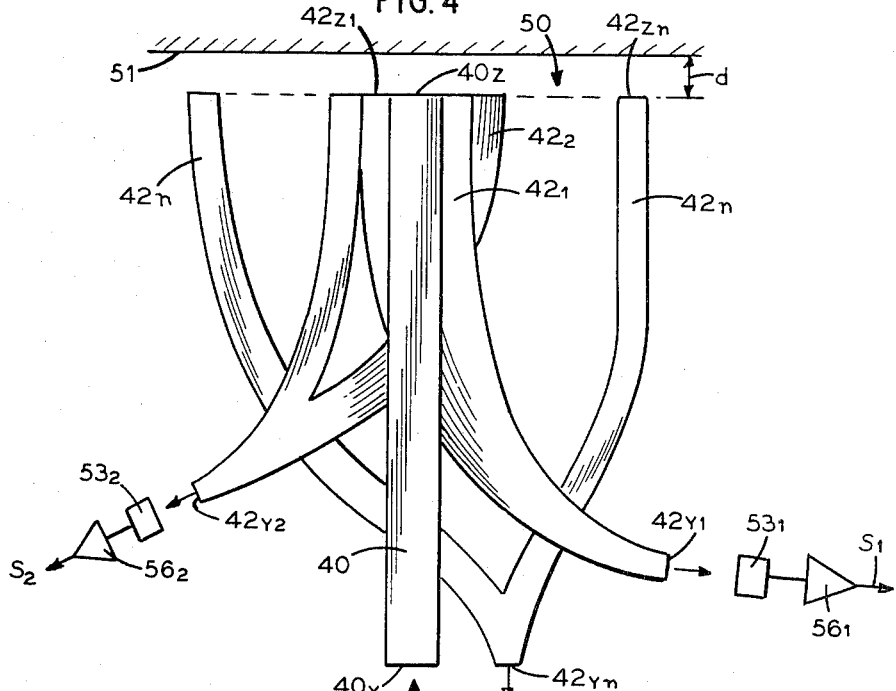
FIG. 4 shows another converter embodying these principles.

Also a large number of receiving bundles can be used such as the series of juxtaposed receiving bundles of FIG. 4 which are associated with one emitting bundle of fibers to increase the operating range of the converter without modifying its sensitivity or its precision. A central transmitting bundle 40 is associated with several receiving bundles $42_1, 42_2, \ldots 42_n$ having each the same configuration and the same radial width L. The respective emitting end $40_z$ and the receiving ends $42z_1, \ldots 42z_n$ are comprised in the same sensing head 50 at a distance $d$ from a surface 51. These receiving ends may be positioned in differently spaced positions with respect to the emitting end or in several surfaces at such positions. The respective output ends $42_{y1}, 42_{y2}, \ldots 42_{yn}$ are disposed adjacent to light flux transducers $53_1, 53_2, \ldots 53_n$ coupled to preamplifiers $56_1, 56_2, \ldots 56_n$, which deliver respective distance related signals $S_1, S_2, \ldots S_n$. The gains of the various preamplifiers $56_1, 56_2, \ldots 56_n$ are adjusted such that the slopes $p1, p2 \ldots pn$ of the linear zones of the characteristics $S_1, S_2, \ldots S_n$ are equal. In this example, the receiver bundle $42_1$ has its receiving end $42_2$ juxtaposed to the emitting end $40_z$ and all the receiving ends $42_{z1}, 42_{z2}, \ldots 42_{zn}$ are juxtaposed to one another although if desired there can be one or more transverse gaps between some of these ends in the sensing head 50. The arrangement depicted by FIG. 4 is such that the characteristic curve for $S_1, \ldots S_n$ (FIG. 4A) have their maximum for value $d_c, 2d_c \ldots nd_c$, so that the signal $S_k$ of the $K_{th}$ receiving bundle 42K is used in its linear region of operation when the distance from the test surface to the converter lies between $(K-1) d_c$ and $Kd_c$ (FIG. 4A).

Figure 4A:
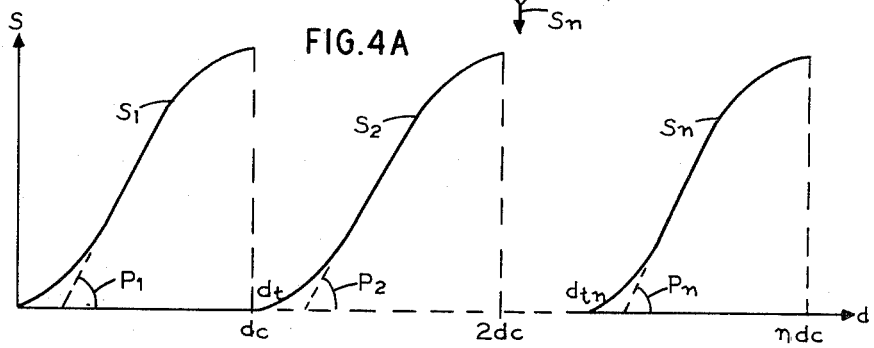
FIG. 4A shows the characteristic of the apparatus of FIG. 4.

With reference to FIG. 4A it can be seen that in the arrangement of FIG. 4 the origin of the Kth characteristic curve substantially occurs for the distance $(K-1)d_c$ of the maximum of the preceding characteristic.

Figure 4B:
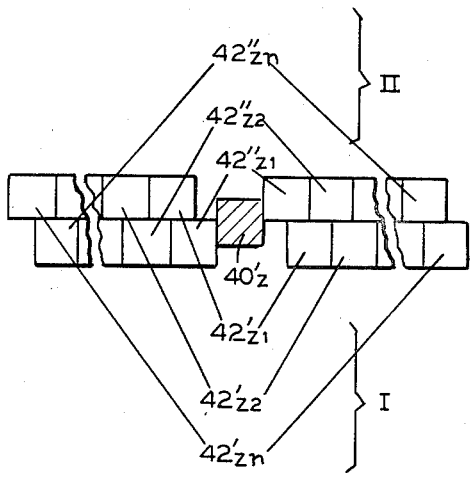
FIG. 4B is a schematic front view of a sensing head of a converter derived from the converter of FIG. 4.

Since the converter incorporating this feature is usable only in the linear parts of the characteristics $S_1, S_2, \ldots$ there still remain some "blind" zones between the linear zones. FIG. 4B shows a front view of the sensing head of a converter to obviate this disadvantage by providing two series, I, II of receiving ends identical to the series shown in FIG. 4, the series I ($42'_{z1}$ to $42'_{zn}$) being radially offset with respect to series II ($42''_{z1}$ to $42''_{z2}$). Each receiving end $42'_z$ and $42''_z$ is associated to a transducer coupled to a preamplifier via a corresponding receiving bundle $42'$ and $42''$. In this manner, the spacings between the respective receiving ends and the emitting end are such that the linear parts of the signal characteristic curves of one of the series coincide with the non linear or "blind" zones of the other series, and the converter is thus usable over a continuous distance range of operation, without interruption and with the same sensitivity and the same precision, this continuous range being made up of the successive individual ranges of linear variation of the signals issued from each receiver bundle.

In this case the individual receiving ends overlap when their position is referred to a common radial reference line, i.e., when their spacings from the emitting end are referenced to a common axis. Note that this can still be true and the same result be obtained if the receiving ends of each bundle or elementary bundle are not as clearly individualized as shown in the preceding examples, some fibers stemming out of two or more distinct receiving bundles having their ends interlaced in the sensing head for example. The same remark applies to other embodiments where fiber ends of some receiving ends may be partially intermingled while still embodying the principles of the invention. Also the shapes of these receiving ends are not limited to those shown in these figures nor are their sizes necessarily equal.

Figure 5:
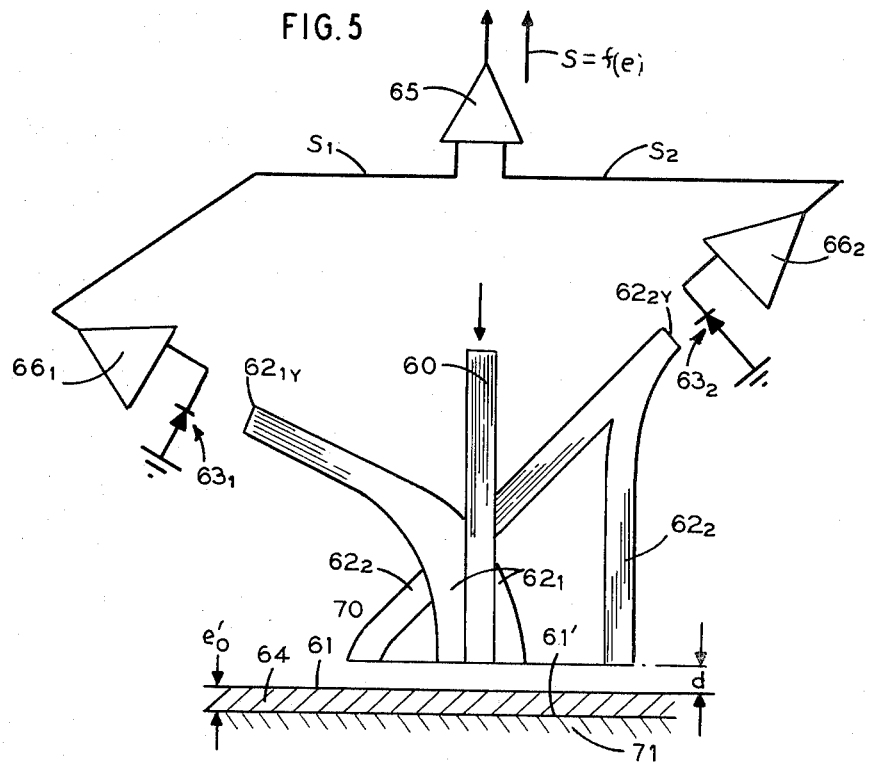
FIG. 5 shows an optical converter adapted for the measurement of the thickness of transparent bodies.

FIG. 5 shows a schematic diagram of a converter adapted for the measurement of the thickness of a transparent body 64 of average thickness $e'_o$ in accordance with the invention. This transparent body such as a sheet or slide of glass or plastic lies on a support 71 opposite the sensing head 70 and normally fixed relative thereto. The converter comprises a central transmitting bundle 60 and two annular receiving bundles $62_1$ and $62_2$, having as previously described respective emitting and receiving ends in the sensing head 70 and respective light admitting $60_y$ and light output ends $60_{y1}$ $62_{1y}$ and $62_{2y}$. The receiving bundles 62and 62₂ have their receiving ends arranged with respect to the emitting end to direct the luminous fluxes respectively reflected by the front face 61 and the rear face 61' of the body 64 towards two photoelectric detectors $63_1$ and $63_2$. The outputs of these detectors are respectively connected, via two preamplifiers $66_1,66_2$ to the inputs of a differential amplifier 65 which furnishes an output signal S representative of the difference between the distance related signals $S_1$ and $S_2$.

Due to the refraction the sensing head 70 "sees" the rear face 61' through the front transparent face 61 at an average distance $d_o+e_o$, where $e_o \approx ne'_o$ and $d_o$ is the average distance $d$. $e_o$ is normally larger than $e'_o$ if the refraction index $n$ of the transparent material of the body 64 is greater than the index of air. $e_o$ is thus the average thickness of a slice of air equivalent from the point of view of the sensing head 70 to the average thickness $e'_o$ of the body.

The parameters L and $\phi_o$ of the converters are adjusted so that the characteristics $S_1$ and $S_2$ (FIG. 5A) corresponding to the two receiving channels respectively including receiving bundles $62_1$ and $62_2$ are such that the centers of their linear zones (or mid-range distance of linear variation) — which have the same slope $p$ by proper adjustment of the gain of amplifiers $66_1$ and $66_2$ for example — are spaced apart by the distance $e_o$ equal to the average thickness of the slice of air equivalent to the average thickness $e'_o$ of the body 14 to be measured. The range width $\Delta_o$ is so selected as to cover, on the one hand, the variations in the real thickness $e$ about the value $e'_o$ and on the other hand, the possible variations in the distance $d$ from the converter to the face 61 of the body 64. This distance $d$ being on the average equal to $d_o$ and the sensitivities of the two receiving channels being equal, the characteristic curve of the output signal S varying as a function of the thickness $e$ can be obtained from FIG. 5A and indicated in FIG. 5B. It can be seen that this characteristic has a linear region of variation of amplitude $\Delta_o$ about the mean value $e'_o$. This form of characteristic is easy to use either for directly measuring the body thickness, or for commanding servo control devices arranged to maintain constant the thickness of a manufactured product.

The receiving bundle $62_1$ also picks up some light reflected by the front face 61. As may be seen the characteristic curve $S_1$ has a decreasing portion as the distance increases beyond $d_c$ which tends to flatten as it gets closer to the $d$ axis.

Figure 5B:
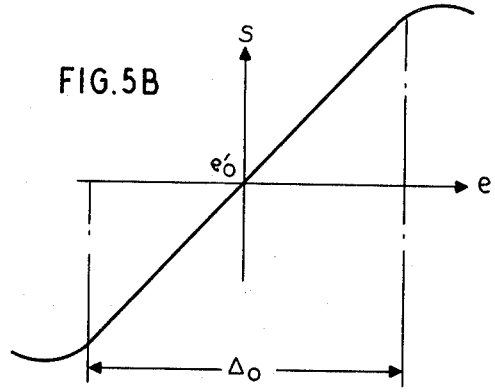
FIGS. 5A and 5B show characteristic curves in connection with the apparatus of FIG. 5.

The true signal $S_1$ delivered by the preamplifier 66 thus represents the sum of the light fluxes picked up by the receiving bundle $62_1$ and reflected by the rear face 61' and the front face 61 of the body 64. $S_2$ designates the signal delivered by $66_2$ and represents light reflected by 61' only. The characteristic of FIG. 5B showing the variation of S as a function of the thickness $e$ is only valid if the portion of light reflected by the front face and which is picked up by the receiver bundle $62_1$, as represented by value of $S_1$, around $d_o+e_o$, has a negligible effect. This is what happens if $e_o$ is large enough so that the linear variation of $S_2$ occurs in a distance range for which $S_1$ is small enough and varies in a substantially linear manner so as not to cause any distortion of the differential signal S. In other words, the differential converter of FIG. 5 previously described is suitable if the thickness of the transparent body to be measured is large relative to the sum of possible thickness variations and possible variations of the distance $d$ from the front face to the converter, and if the power of reflection (reflectivity) of the rear face of the transparent body is not too large with respect to the reflection power of the forward face thereof.

Referring again to FIG. 5A where $S_1$ and $S_2$ designate the signals corresponding to the luminous fluxes respectively received by the first and second receiver bundles $62_1$ and $62_2$, and where $p$ is the common slope of the linear portions of $S_1$ and $S_2$ respectively about $d_o$ and $d_o + e_o$, the following relationships can be written:

$$S_1 = p(d - d_o) + Q[(d + e) - (d_o + e_o)] + S_o + s_o \quad (1)$$

$$S_2 = p[(d + e) - (d_o + e_o)] + S_o \quad (2)$$

Figure 5A:
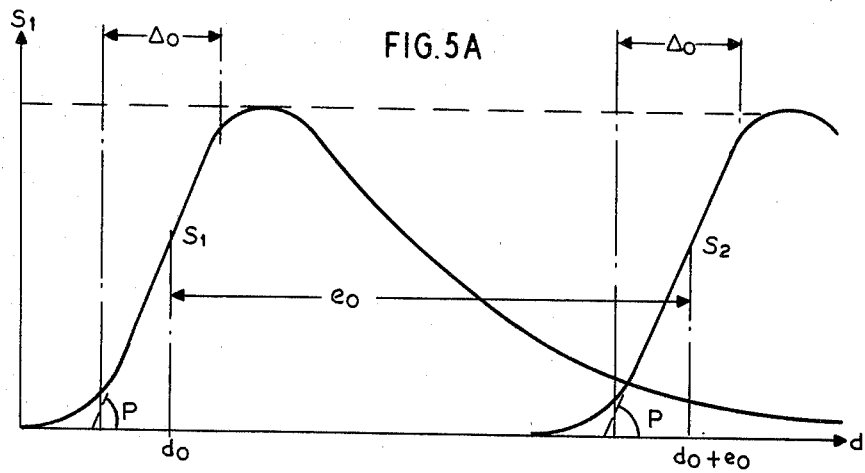

In these relationships $S_o$ is the common value taken by $S_1$ and $S_2$ respectively for $d = d_o$ and $d + e = d_o + e_o$ assuming that the rear face 61' makes a zero contribution to the signal S which is the case in FIG. 5A where $d_t$ is beyond $d_c$; for a given adjustment of the parameters of the converter, Q is the slope of the curve $S_1$ and for the same adjustment $s_o$ is the value of the signal $S_1$ for $d = d_o + e_o$ when it is assumed that the front face 61 makes a zero contribution to the signal, the respective values of the coefficients of reflection of the rear and front faces 61' and 61 of the transparent body being taken into account.

The value of the differential signal $S = S_2 - S_1$ is then:

$$S = (p - Q)(e - e_o) - Q(d - d_o) - s_o \quad (3)$$

If $d_o + e_o$ is large relative to $d_o$, Q is then negligible due to the flattening of the characteristic $S_1$. If the reflection coefficients of the transparent body are of the same order of magnitude $s_o \approx 0$. Under these conditions, the value of S is depicted by the diagram of FIG. 5B. However if the parameter Q is not negligible, the auxiliary term $Q(d - d_o)$ in the expression of S may cause substantial errors in the determination of the thickness $e$, unless the distance $d$ of the converter to the front face 61 of the transparent body remains at a quite constant value.

FIG. 6 represents a thickness measuring apparatus according to the invention which includes provisions for eliminating the troublesome auxiliary term mentioned above.

On this schematic drawing a transparent body 114 the thickness of which is to be measured is placed on a supporting member 100. This member 100 may be at a testing station of a body manufacturing machine such as for making plates or blades of glass for example, this surface being located next to the manufacturing unit so that the optical converter may control the manufacturing process to maintain a desired thickness. The support member 100 may also be a platform for an individual testing apparatus intended to receive samples of transparent materials or bodies to be tested.

The upper surface 101 of the support 100 on which the transparent body 114 is resting can be made of a light reflecting material such as metal for example. The transparent body 114 of average thickness is resting on the surface 101 by its rear face 111' and has a front face 111. Opposite face 111 is the sensing head 104 of the apparatus in a plane 105 located at a distance D from the rear surface 111' and $d$ from the front surface 111 of the body 114. in the sensing head 104 are disposed the respective ends of a transmitting bundle 110 and at least three receiving bundles $122_1$, $122_2$, $122_{n+1}$, these ends being designated by $110_a$, $122_{1a}$, $122_{2a}$ and $122_{n+1a}$. The first two receiving bundles $122_1$ and $122_2$ are juxtaposed in this case as shown in FIG. 6, their respective receiving ends $122_{1a}$ and $122_{2a}$ being in contact with one another. The output end of each receiving bundle is associated with a corresponding photo electric detector, these detectors being respectively designated by $113_1$, $113_2$, $113_{n+1}$. The detectors $113_1$ and $113_2$ are respectively connected to the inputs $(+)$ and $(-)$ of a first differential amplifier 131 via two respective amplifiers $116_1$ and $116_2$ delivering respective signals $S_1$ and $S_2$. As indicated before, the amplifiers $116_1$ and $116_2$ have gains adjusted to make equal the slopes of the linear portions of the characteristic curves representing the variations of $S_1$ and $S_2$ as a function of the distance between the sensing head 104 and the respective surface 111 and 111'. The output of the photoelectric detector $113_{n+1}$ is connected to an amplifier $116_{n+1}$ having its gain adjusted as will be explained later to deliver a signal $S_{n+1}$. A second differential amplifier 132 is provided having an input $132A_1$ $(-)$ coupled to the output 131B of the differential amplifier 131 and the other input $132A_2$ $(+)$ coupled to the output of preamplifier $116_{n+1}$.

In operation, the first detector $113_1$ receives from the front face 111 of the body 114 a luminous flux which is proportional to:

$$p(d - d_o) + S_o \quad \text{(See FIG. 6A)} \tag{4}$$

When the light transmitted by the transmitting bundle 110 strikes the transparent body 114, luminous fluxes of light reflected by the rear face 111' are also transmitted by the receiving bundles $122_1$, $122_2$ and $122_{n+1}$ to the respective detectors $113_1$, $113_2$ and $113_{n+1}$, the signals at each of said detectors being respectively proportional to:

for $113_1$ $$Q(D - D_o) + s_o \tag{5}$$

for $113_2$ $$Q'(D - D_o) + s'_o \tag{6}$$

for $113_{n+1}$ $$p(D - D_o) + S_o \tag{7}$$

$Q'$ being the slope of the linear portion of the curve $S_2$ for $d = d_o + e_o$, and $s'$ the signal value of $S_2$ for $d = d_o + e_o$.

D and $D_o$ are defined by equations (10) and (11) below.

Figure 6A:
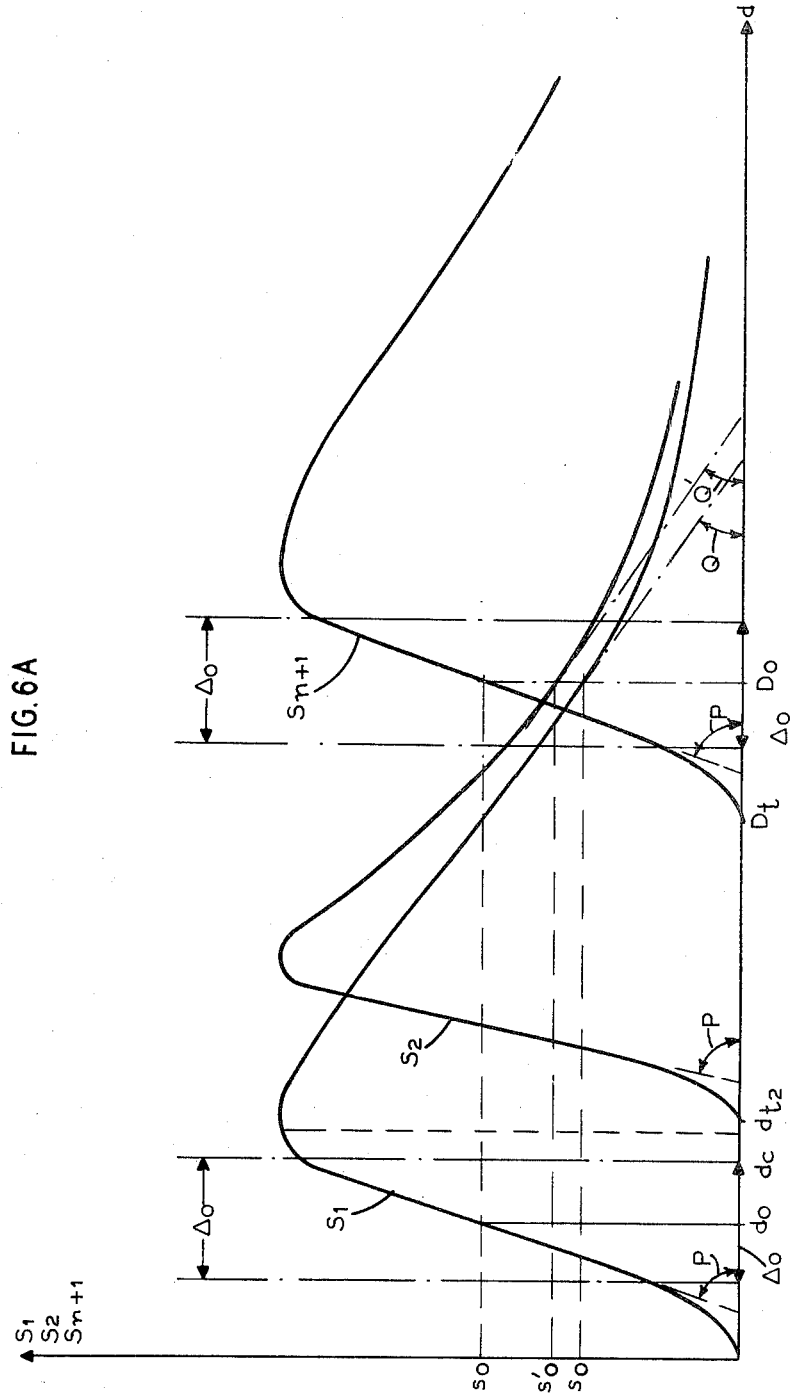
FIG. 6A shows characteristic curves in relation to the converter of FIG. 6.

It must be understood that detectors $113_2$ and $113_{n+1}$ (curves $S_2$ and $S_{n+1}$ of FIG. 6A) do not actually receive any luminous flux from the front face 111 of the transparent body 114 in accordance with the construction of the apparatus itself and provided that the following conditions are satisfied (as best shown by FIG. 6A)

$$D_o - (\Delta O/2) \quad D \quad D_o + (\Delta o/2) \tag{8}$$

$$d_o - (\Delta o/2) \quad d \quad d_o + (\Delta O/2) \tag{9}$$

$$D = d + e \tag{10}$$

$$D_o = d_o + e_o \tag{11}$$

It is clear from FIG. 6 that in this case by construction of the apparatus according to principles previously disclosed, the origins $d_{t2}$ and $D_t$ of the curves S2 and $S_{n+1}$ are beyond the range $\Delta_o$ of linear variation of $S_1$ about $d_o$ and therefore that the light reflected by the front face 111 has no effect on detectors $113_2$ and $113_{n+1}$.

The following relationships give the mathematical representation of the various signals $S_1$, $S_2$ and $S_{n+1}$ at the output of the three detectors $113_1$, $113_2$ and $113_{n+1}$ under the previously stated conditions:

$$S_1 = p(d - d_o) + Q(D - D_o) + S_o + s_o \tag{12}$$

$$S_2 = Q'(D - D_o) + s'_o \tag{13}$$

$$S_{n+1} = p(D - D_o) + S_o \quad (14)$$

Again this also results from the construction of the sensing head 104 with respect to size and distribution of the various emitting and receiving ends of the various transmitting bundles as well as from the position of this sensing head 104 with respect to the upper surface of the supporting member 100 and to the thickness of the body of transparent material to be tested.

In operation, one can understand that the first differential amplifier 131 makes the difference:

$$S_1 - S_2 = p(d - d_0) + (Q - Q')(D - D_o) + S_o + s_o - s'_o \quad (15)$$

By proper adjustment of the gain of the preamplifier $116_2$ it is possible to make $Q = Q'$ that is, to produce characteristic curves representing $S_{decreases}$ and $S_2$ having substantially the same negative slopes for $d = d_o + e_o$, the portions of the curves $S_1$ and $S_2$ considered here being those for which the value of the respective signals decreases as the distance $d$ increases. If such an adjustment of the gain of the preamplifier $116_2$ is made the preceeding relationship (15) becomes:

$$S_1 - S_2 = p(d - d_o) + S_o + s_o - s'_o \quad (16)$$

The differential signal provided at the output $131_B$ of the differential amplifier 131 which is fed by the luminous outputs of the two first receiving bundles $122_1$ and $122_2$ is proportional to the distance $d$ plus or minus a constant. The differential amplifier 132 outputs the signal S of difference, between the signal $S_{n+1}$ and the signal at the output 131B of differential amplifier 131:

$$S = S_{n+1} - (S_1 - S_2) = p[(D-d) - (D_0 - d_o)] + s'_o - s_o \quad (17)$$

This signal can be written as:

$$S = p[e - (e_o + \Sigma_o)]$$

when $$\Sigma o = s_o - s'_o/p \quad (18)$$

The relationship (18) shows that the final output signal S does not depend any more on the distance $d$ from the sensing face 104 to the front face 111 of the transparent body 114. Besides, the average thickness of the air slice which has a thickness equivalent to that of the transparent body 114 is not $e_o$ but $(e_o + \Sigma_o)$ and consequently depends not only on the average thickness $e'_o$ of the transparent body under test but also of the particular characteristics of the converting apparatus itself.

It should be noted here that the differential signal $S_1 = S_2$ emerging from the two juxtaposed receiving bundles provides a way of measuring the distance $d$. Thus a converting apparatus is obtained which makes it possible to measure the values of $d$ and $e$ independently from each other without being trouble at all by the luminous flux reflected by the rear face 111' in any one of these measurements.

The thickness measuring apparatus just described has one light transmitting bundle for illuminating the body 114, two first and second receiving bundles $122_1$ and $122_{n+1}$, each more particularly assigned to one face of the transparent body 114 and a third receiving bundle for compensating the thickness measurements made. It must be understood that all the particular features described with reference to FIGS. 3, 4 and 4B may adequately be embodied in the apparatus of the invention. Each of the first and second receiving bundles may be replaced by a series of bundles to obtain different ranges of linear operation which may or may not overlap according to the particular need for a continuous range of operation. Of course, the first receiving bundles may have any desirable rank K along the sensing surface 104. In other words, it does not necessarily need to be juxtaposed to the transmitting bundle 110. The auxiliary receiving bundle is juxtaposed to this first bundle and if this first bundle is spaced from the emitting end 110 by an amount of K unit spacings (receiving bundle $122_K$) then the juxtaposed receiving bundle will then have a rank K+1 (bundle $122_{K+1}$). The combination of the measurements made by these two first and auxiliary receiving bundles enables then measuring the distance $d$ in a distance or range $$d_o + (K - 1)\Sigma_o \pm (\Delta_o/2) \quad (19)$$

where $\Sigma_o$ stands for the amount by which the origin $d_{tk}$ of the characteristic curve of a signal $S_K$ is shifted when this characteristic curve is translated to the position of the characteristic curve of a signal $S_{K+1}$ picked up by a receiver bundle of rank (K + 1) (FIG. 4A). In other words $\Sigma_o$ can be considered as the pitch or unit spacing of the various respective characteristic curves of signals picked up and transmitted by juxtaposed receiving bundles. The second receiving bundle is then chosen with a rank $n$ such that if $$(n - K)\Sigma_o = e_o$$

it is then possible to measure the thicknesses of the equivalent slice of air of a transparent body in a thickness range $$e_o + (s_o - s'_o/p) \pm (\Delta_o/2)$$

Such a converter as stated before is particularly well suited for thickness measurements of transparent bodies having their rear face resting on a reflecting surface such as a metallic surface for example.

What is claimed is:

1. Apparatus for producing at least one indication of relative distance between several faces including a reference face of said apparatus and front and rear faces of a transparent body spaced apart by the thickness thereof and opposite the reference face comprising:
    optical guide means having one emitting end at the reference face for transmitting light toward these spaced apart faces so as to be reflected by them;
    optical guide receiver means having at least a first receiving end operatively arranged for transmitting within an apparatus working range and a body thickness range a flux of light reflected by both of these front and rear faces to produce a first signal functionally related to both distances from the reference face to the front and rear faces of the transparent body;

further optical guide receiver means having a receiving end operatively arranged for transmitting within the same working and thickness ranges a flux of light reflected substantially only by the rear face of the transparent body to produce an auxiliary signal functionally related to the distance from the reference face to the rear face of the body; and means responsive to said first and auxiliary signals for producing at least an indication of distance from the front face to one of the rear and reference faces, which is compensated for the effect of light reflected by the rear face of the transparent body of the first signal.

2. The apparatus of claim 1 wherein said optical guide receiver means includes at least a second receiving end operatively arranged for transmitting within the working and thickness ranges a flux of light reflected by the rear face of the transparent body to produce a second signal functionally related to the distance from the reference face to the rear face of the transparent body, and wherein said signal responsive means is also responsive to said second signal for producing an indication of the thickness of the transparent body compensated for the effect of light reflected by the rear face on said first signal.

3. The apparatus of claim 2 wherein said receiver means is adapted for producing such first and second signals which vary as substantially linear functions of the distances from the reference face to the front and rear faces respectively, with substantially the same rate of linear variation within the working and thickness ranges, and said signal responsive means is operatively arranged for producing such a compensated indication of the thickness of the transparent body which is functionally related to the difference between said first and second signals.

4. The apparatus of claim 2 wherein said further receiver means is adapted for producing such auxiliary signal which varies with distance between the reference face and the rear face of the transparent body at substantially the same rate as said first signal within the working and thickness ranges, and said signal responsive means is adapted for producing such compensated indication of the thickness of the transparent body which is functionally related to the difference between said first signal on the one hand and said auxiliary and second signals on the other hand.

5. The apparatus of claim 2 wherein the receiving end of said further receiver means is juxtaposed to said first receiving end at a different transverse spacing from said emitting end.

6. The apparatus of claim 2 wherein said further receiver means includes means for adjusting the rate of variation of the auxiliary signal with distance from the reference face to the rear face of the transparent body within the working and thickness ranges.

7. The apparatus of claim 1 wherein said first receiving end is operatively arranged with respect to said emitting end for producing such first signal which varies as a substantially linear function of the distance from the reference face to the front face of the transparent body, said further receiver means is adapted for producing such auxiliary signal which varies at substantially the same rate as of said first signal with distance between the reference face and the rear face of the transparent body within the thickness and working ranges, and said signal responsive means is operatively arranged for producing such compensated indication of distance from the reference face to the front face of the transparent body which is functionally related to the difference between said first and auxiliary signals.

8. Apparatus for producing indications of distance between first and second spaced apart faces opposite a reference face of the apparatus within an operating range of distance from the reference face to the first face and an operating range of spacing between the first and second faces comprising:

optical guide means having an emitting end at the reference face for transmitting light toward these spaced-apart faces so as to be reflected by them;

measure optical guide receiver means having first and second receiving ends arranged with respect to said emitting end for transmitting different fluxes of the reflected light to produce respective first and second signals functionally related, respectively, to the distances from the reference face to said first and second faces within these operating ranges;

auxiliary optical guide receiver means having a third receiving end operatively arranged with respect to said emitting end for transmitting a different flux of the light reflected substantially only by the second one of the spaced apart faces to produce a third signal; and means for combining said first, second and third signals to obtain an indication of distance between the first and second faces.

9. The apparatus of claim 8 wherein:

said receiving ends are so spaced with respect to said emitting end that within the operating ranges said first receiving end receives light reflected by both the first and second faces whereas said second receiving end substantially receives light reflected by the second face alone; and said combining means is operatively arranged for utilizing said third signal to compensate the effect of the light reflected by the second face on said first signal to obtain a compensated indication of the distance between the first and second faces.

10. The apparatus of claim 9 wherein said auxiliary optical guide receiver means further includes means for producing such third signal which varies with distance from said reference face to the second face at a rate which is in a predetermined relationship to the rate of variation of said first signal with the same distance.

11. Apparatus for producing at least one indication of relative distance between several faces including a reference face of said apparatus and front and rear faces of a transparent body spaced apart by the thickness thereof and opposite the reference face comprising:

optical guide means having one emitting end at the reference face for transmitting light toward these spaced apart faces so as to be reflected by them;

measure optical guide receiver means having at least a first receiving end operatively arranged for transmitting within an apparatus working range and a body thickness range a flux of light reflected by both of these front and rear faces to produce a first signal functionally related to both distances from the reference face to the front and rear faces of the transparent body;

auxiliary optical guide receiver means having a receiving end operatively arranged for transmitting within the same working and thickness ranges a flux of the light reflected by the rear face of the transparent body to produce an auxiliary signal functionally related to the distance from the reference face to the rear face of the body;

said measure receiver means having a different response to light reflected by the front face than that of said auxiliary receiver means if any; and means responsive to said first and auxiliary signals for producing at least an indication of distance from the front face to one of the rear and reference faces, which is compensated for the effect of light reflected by the rear face of the transparent body on the first signal.

12. The apparatus of claim 11 wherein said measure receiver means includes at least a second receiving end operatively arranged for transmitting within the working and thickness ranges a flux of light reflected by the rear face of the transparent body to produce a second signal functionally related to the distance from the reference face to the rear face of the transparent body, and wherein said signal responsive means is also responsive to said second signal for producing an indication of the thickness of the transparent body compensated for the effect of light reflected by the rear face on said first signal.

* * * * *

UNITED STATES PATENT OFFICE
CERTIFICATE OF CORRECTION

PATENT NO. : 3,771,873
DATED : November 13, 1973
INVENTOR(S) : Jean Tourret

It is certified that error appears in the above-identified patent and that said Letters Patent are hereby corrected as shown below:

Column 1, lines 11 and 22, "optIcal" should be -- optical --;
         line 27, "Surface" should be -- surface --;
         line 29, "obtaIn" should be -- obtain --.
Column 2, line 10, "f'ux" should be -- flux --;
         line 35, "tubu'ar" should be -- tubular --;
         line 53, "sometImes" should be -- sometimes --;
         line 64, "representive" should be -- representative --.
Column 3, line 23, "diamension" should be -- dimension --.
Column 7, line 32, "in" should be -- In --.
Column 8, line 33, Equation 8 should read:

$$D_0 - \frac{\Delta_0}{2} \leq D \leq D_0 + \frac{\Delta_0}{2}$$

Column 8, line 35, Equation 9 should read:

$$d_0 - \frac{\Delta_0}{2} \leq d \leq d_0 + \frac{\Delta_0}{2}$$

Column 9, line 21, "$S_{decreases}$" should be -- $S_1$ --;
         line 63, "$=S_2$" should be -- $-S_2$ --;
         line 67, "trouble" should be -- troubled --.
Column 10, line 49, the equation should read:

$$e_0 + \frac{s_0 - s'_0}{p} \pm \frac{\Delta_0}{2}$$

Column 11, line 15, "of" should be -- on --.

Signed and Sealed this

Seventeenth Day of August 1976

[SEAL]

Attest:

RUTH C. MASON
Attesting Officer

C. MARSHALL DANN
Commissioner of Patents and Trademarks